Sept. 16, 1958     C. A. DAVENPORT ET AL     2,852,697

OPTICAL SYSTEM FOR MEASUREMENT AND CONTROL

Filed March 10, 1954     2 Sheets-Sheet 1

INVENTORS
CLARENCE A. DAVENPORT
AND CARL C. DALY
BY

ATTORNEY.

Sept. 16, 1958  C. A. DAVENPORT ET AL  2,852,697
OPTICAL SYSTEM FOR MEASUREMENT AND CONTROL
Filed March 10, 1954  2 Sheets-Sheet 2

INVENTORS
CLARENCE A. DAVENPORT
AND CARL C. DALY
BY
Edw. P. Evers
ATTORNEY.

United States Patent Office 2,852,697
Patented Sept. 16, 1958

2,852,697

OPTICAL SYSTEM FOR MEASUREMENT AND CONTROL

Clarence A. Davenport, Ferguson, and Carl C. Daly, Glendale, Mo., assignors to Clarence A. Davenport, trustee Application March 10, 1954, Serial No. 415,251

4 Claims. (Cl. 250—237)

This invention pertains to an optical system for use in setting up automatic measurement or control facilities, such, for instance, as may be used in industrial operations for measuring quantity or quality values of industrial products, detecting and indicating critical conditions in such operations or products, providing safety protection for apparatus, and other applications.

An object of this invention is to provide means for forming a light beam into a broad, thin beam providing in effect a "sheet of light" extending across an active area wherein the effect to be measured takes place.

Another object is to provide, in combination with such means forming a sheet of light, means for directing the light, after it has passed the active area, onto a photo-sensitive unit which is connected to actuate means for measuring items passing the active area, and/or controlling the operation of a machine or apparatus involved in processing such items.

One embodiment of this invention described herein and illustrated in the accompanying drawings is applied to a safety device for industrial machines to insure that the operator's hands are out of danger before the machine may be put into operation. Another is applied to the measurement of a flowing fluid.

Generally stated, the embodiments of the invention described herein include an elongated light source and a lens arranged to direct the light in a wide, thin beam. This beam is then passed through a bank of parallel, closely spaced, nonreflecting baffles which confines the beam to substantially parallel rays. The beam so formed is then projected across the active area. A second bank of similar baffles is placed beyond said area in a window of a dark chamber and serves to permit the beam to enter the chamber but to shut out extraneous light. Within the dark chamber means are provided to direct all the light of the beam upon a photo-sensitive unit which is connected to operate the controls of a machine or an indicator for measurement, so that when any substantial amount of light is interrupted in the active area, as, in the first case, by the operator moving his hand into that area, the change in intensity of the light reaching the photo-sensitive unit will cause it to stop the machine.

Figure 1:
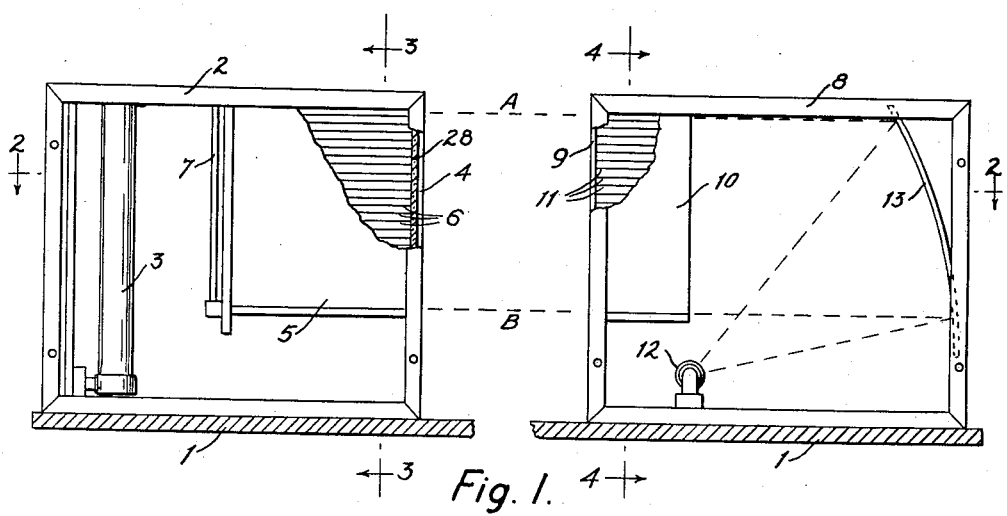
Figure 2:
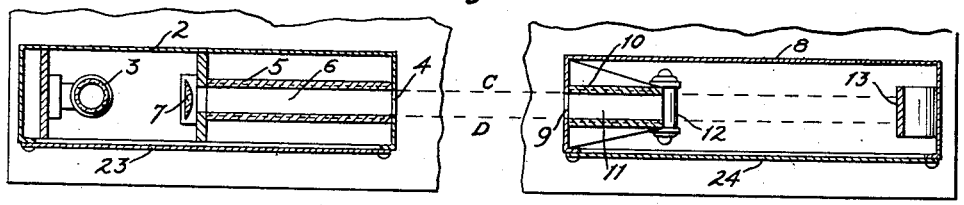
Figure 3:
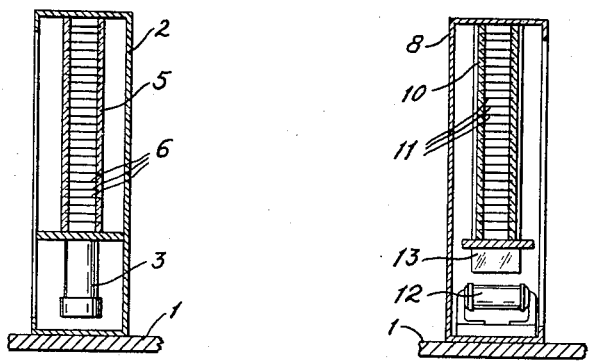
Figure 4:
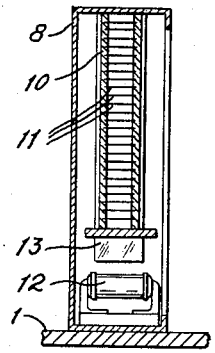
Figure 5:
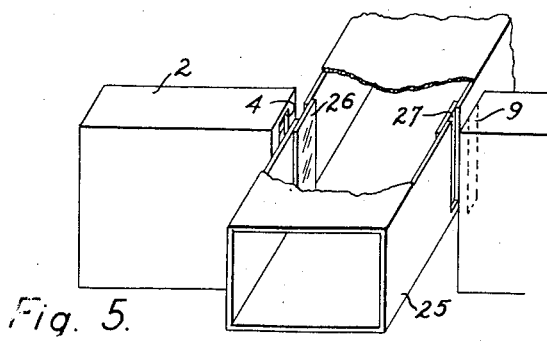
Figure 6:
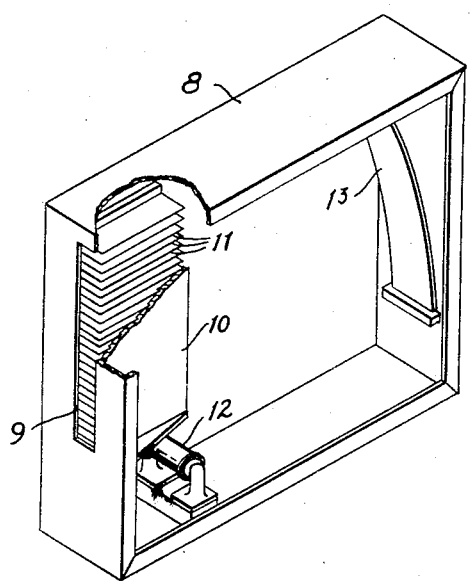
Figure 7:
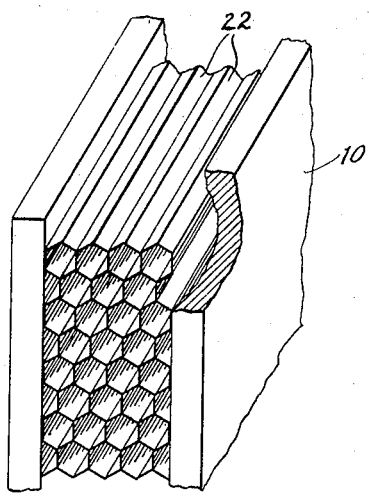
Figure 8:
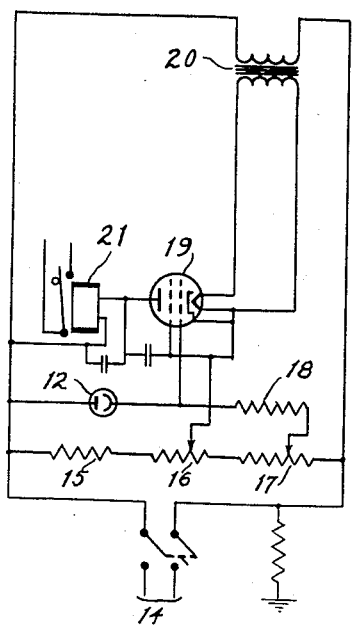

In the accompanying drawings:

Figure 1 is a front view of a safety device embodying this invention, with the covers of the light boxes removed, and parts in section, Figure 2 is a section on line 2—2 of Fig. 1, but with the covers in place, Figure 3 is a section on line 3—3 of Fig. 1, Figure 4 is a section on line 4—4 of Fig. 1, Figure 5 is a diagrammatic perspective view showing an arrangement for monitoring or measuring a flowing fluid, Figure 6 is a perspective view of the light-receiving box with parts in section, Figure 7 is an enlarged perspective view showing another arrangement of baffles, and Figure 8 is a diagram of the control circuit.

Referring now to the drawings, 1 designates the table or bed of a machine to be protected, and the active area is the area above the middle portion of this table (considered in a vertical plane) through which the operator must move his hands in loading and unloading the machine or adjusting the workpiece or material operated upon. Mounted on the table 1 to one side of the active area is a light box 2, which may be considered the transmitting box, in which a light source 3 is mounted. The light source 3 is shown as an elongated lamp, which may be of the incandescent-filament type or other type, such as a fluorescent lamp or the like. This lamp may be connected to a suitable supply circuit, not shown.

When a filament-type lamp 3 is used an elongated cylindrical lens 7 may be mounted in parallel relation thereto to form the light into a wide beam of horizontally parallel rays. This beam is projected through a window 4 in the end of the box 2. Between the lens 7 and the window 4 is a bank 5 of parallel baffle plates 6. These baffles may be of metal, cardboard, or other suitable opaque material, and have blackened surfaces to make them non-reflecting. They are mounted in parallel relation so that light may pass through the bank 5 between the baffles in the horizontal direction as shown in Fig. 1. The lens 7 is so positioned with relation to the lamp 3 as to refract the light therefrom into a beam of parallel rays passing through the bank 5 and out at the window 4 to be projected across the active area toward the right in a beam of substantially uniform intensity.

The light of the lamp 3 is thus formed into a wide, thin beam of substantially parallel rays. The vertical width of this beam is represented by the height of the window 4, indicated by the broken lines A and B in Fig. 1, and its horizontal thickness is the width of the window 4, indicated by the broken lines C and D in Fig. 2. The rays, after passing the lens 7, are substantially parallel in any horizontal plane, and all the rays which deviate substantially from parallelism in any vertical plane are intercepted by the baffles 6. Accordingly, there is formed what is practically a "sheet of light" of substantially parallel rays projected across the active area.

Mounted on the table 1 on the opposite side of the active area from the box 2 is a second light box 8 provided on the side facing the box 2 with a window 9 of substantially the same shape and size as the window 4. Mounted in the window 9 is a bank 10 of baffle plates 11 of construction similar to that of the bank 5. The box 8 may be considered the light-receiving box, and is positioned so that the beam of light issuing from the window 4, after passing across the active area, enters the window 9 and passes through the bank 10 to the rear (right, Fig. 1) of the box 8. The box 8 provides, when its cover is in place, a dark chamber into which the light of the beam may enter but from which the baffles 11 shut out extraneous light.

Mounted in the box 8 is a photo-sensitive unit 12, such as an electronic photo tube or the like, and also a concave mirror 13 positioned to receive the beam of light and concentrate it upon the unit 12. It is preferable that substantially all the light of the beam be directed upon the unit 12 since that unit responds in accordance with the intensity of the light falling upon it and, therefore, any reduction of such intensity by intercepting any substantial part of the beam will cause a corresponding response by said unit. A lens may be used in place of the mirror 13 to concentrate the light, but for the present embodiment a mirror is preferred.

The response of the unit 12 to changes of light intensity may be used to actuate controls in any suitable manner. Figure 8 is a diagram of a circuit which may be used. The unit 12 may be connected to a suitable supply circuit 14 through suitable control resistors 15, 16, 17, and 18, and connected to the grid of a relay tube 19, a gas tetrode, supplied through a transformer 20 from the circuit 14. The tube 19 controls a relay 21 which is connected in any suitable manner to control the power supply of the machine 1. Thus any reduction in the intensity of illumination of the unit 12 will cause it to change the grid bias of the tube 19 so as to cause the latter to open the relay 21 to stop the machine.

Figure 7 shows a modified form of baffle which may be used in the banks 5 and 10. In this arrangement the baffle plates 22 are assembled to form hexagonal tubes as shown. Other polygonal shapes, such as squares, rectangles, triangles, etc., may of course be used to form the tubes.

In the use of this device the boxes 2 and 8 are mounted on the machine on opposite sides of the active area as indicated in Figs. 1 and 2. The covers of these boxes, 23 and 24 respectively, are put in place so as to shut out all light except that of the lamp 3. Said lamp is turned on and the circuit of Fig. 8 adjusted to the desired condition of response. Thereafter, so long as any part of the operator's body, or any other object, intercepts light of the beam between A, B, C, and D the circuit of the power drive of the machine will be held open. As soon as the object is withdrawn so as to complete the beam, said circuit will be conditioned for operation. It will be noted that interception of light in any part of the beam will affect the unit 12, since light rays traverse every part of the beam and there are no "blind spots." And since substantially all the light reaches the unit 12, interception of any substantial part of it will cause said unit to respond.

The same, or a similar arrangement, may be applied to automatic apparatus wherein a part of the machine, instead of the operator's hands, moves into the active area to perform preliminary operations. The movement of such part through the light beam will control the operation of the safety mechanism.

In the embodiment illustrated in Fig. 5 the boxes 2 and 8 are set up in the same relative positions as in Fig. 1 so that the light beam passing between the windows 4 and 9 defines the active area. Means are provided, in the form of a conduit 25, for conducting a fluid through the active area. This may be a gas or a liquid. This conduit may be provided with windows 26 and 27, aligned with the windows 4 and 9, to permit the light to pass through the flowing fluid. The varying intensity of the light falling on the unit 12 will then be a measure of the density of smoke or dust carried by a gas, the turbidity of a liquid or changes in the color thereof, and other effects depending upon the amount of light interrupted by the material passing through the active area. The response of the unit 12 may be used, as in Fig. 8, to control mechanism, or for measurement, in which case the relay 21 would usually be replaced by a measuring instrument.

In a similar manner other items than fluids may be passed through the active area. Solid items may be so passed, as by a mechanical conveyor in the place of the conduit 25, and such items may be counted or, if items of different sizes are passed, they may be counted and also classified according to size.

Where color values are involved a color screen 28 may be placed across the window 4 to color the issuing light correspondingly. For example, in the safety device of Fig. 1, if a red screen 28 is used with a red-sensitive unit 12, if the operator happens to be smoking the smoke blown through the active area will not affect the operation since red light penetrates smoke very effectively. On the other hand, smoke density may be measured, with the arrangement of Fig. 5, by using a blue screen and a blue-sensitive unit 12.

The active area may of course be extended to any desired magnitude, and the beam may be redirected by means of mirrors to form a "fence" of light partially or wholly enclosing a given region, and any item entering or leaving that region through the beam will cause a response by the unit 12.

Changes may be made in the details of construction, within the scope of the appended claims, without departing from the spirit of this invention. Parts of the invention may be used without the whole and improvements may be added while retaining some or all of the advantages of the invention.

Having thus described the invention, what is claimed is:

1. In a safety device of the character described, an optical system comprising, an elongated continuous light source, an elongated cylindrical lens in parallel relation to the light source, a window, thin baffles in said window directing the light in a substantially uniform beam for the length and width of the window, said beam being directed across the active area of a machine, a single photosensitive unit, means in the path of said beam after passing said area operating to direct substantially all the light of the beam on said unit, and means controlled by said unit controlling the operation of the machine.

2. In a protective system for a machine, means for projecting a beam of light of substantially uniform intensity across the bed of the machine, a series of light baffles on said projecting means, a transparent red screen on said series of baffles, a dark box having a window adapted to admit light from substantially one direction only, a second series of baffles in said window, a single photosensitive unit in said box, said unit photosensitive selectively to red light only, means for concentrating the light on said unit, and connections to said unit controlling the operation of the machine.

3. In an optical system for the control of a machine, means for projecting a monochromatic light sheet of substantially unform luminosity, a dark box having a window, a series of light baffles arranged in said window so as to admit said sheet of light edgewise from substantially one direction only, a single photosensitive unit in said box, said photosensitive unit having a selective response to said monochromatic light, means for concentrating substantially all the light entering by said window on said photosensitive unit, and electrical connections to said photosensitive unit controlling the operation of said machine.

4. A device as in claim 3 in which the baffles in said window are in the form of tubes.

References Cited in the file of this patent

UNITED STATES PATENTS

| | | |
|---|---|---|
| 1,922,188 | Zworykin | Aug. 15, 1933 |
| 1,940,882 | Rich | Dec. 26, 1933 |
| 1,958,128 | Cate | May 8, 1934 |
| 1,962,742 | Jongedyk | June 12, 1934 |
| 2,082,941 | Burnside | June 8, 1937 |
| 2,216,716 | Withem | Oct. 1, 1940 |
| 2,346,240 | Thomas | Apr. 11, 1944 |
| 2,361,235 | Pick | Oct. 24, 1944 |
| 2,442,240 | Hooker et al. | May 25, 1948 |
| 2,550,610 | Smith et al. | Apr. 24, 1951 |
| 2,615,079 | Pardue et al. | Oct. 21, 1952 |

OTHER REFERENCES

Walker: "Photoelectric Cells in Industry," 1948, Pitman Publishing Corp., New York, pages 184 and 185.